United States Patent [19]

Greenspan

[11] Patent Number: 4,763,516
[45] Date of Patent: Aug. 16, 1988

[54] AUTOMATIC TIRE PRESSURE GAUGE

[76] Inventor: Peter D. Greenspan, Rte. 7, Box 595, Chapel Hill, N.C. 27514

[21] Appl. No.: 935,521

[22] Filed: Nov. 26, 1986

[51] Int. Cl.⁴ .......................... B60C 23/02; G01L 7/04
[52] U.S. Cl. ...................................... 73/146.8; 73/741; 73/756
[58] Field of Search ...................... 73/146.8, 744, 741, 73/709, 756; 116/266, 271; 137/224

[56] References Cited

U.S. PATENT DOCUMENTS

| | | | |
|---|---|---|---|
| 1,153,026 | 9/1915 | Campbell | 73/146.8 |
| 1,330,311 | 2/1920 | Engelmann et al. | 73/146.8 |
| 1,485,336 | 2/1924 | Padesky | 73/146.8 |
| 2,542,414 | 2/1951 | Jansen | 73/390 |
| 2,569,120 | 0/1951 | Van Heuvel | 73/390 |
| 3,063,463 | 11/1962 | Gfoll | 137/228 |
| 3,807,432 | 4/1974 | Cain | 137/224 |
| 4,072,048 | 2/1978 | Arvan | 73/146.8 |
| 4,476,803 | 10/1984 | Malec | 116/34 R |

FOREIGN PATENT DOCUMENTS 0023157 6/1907 United Kingdom ............... 73/146.8

Primary Examiner—Donald O. Woodiel
Attorney, Agent, or Firm—Lynn E. Barber

[57] ABSTRACT

This invention comprises an automatic, self-metering tire gauge having an air pressure gauge placed in the air flow path between a tire attachment piece and a filler needle valve. The gauge may remain attached to the tire at all times, including while air is being added to the tire. The gauge may be adjusted to indicate the pressure in the tire continuously whether or not the tire is being filled with air through the filler needle valve.

19 Claims, 4 Drawing Sheets

AUTOMATIC TIRE PRESSURE GAUGE

FIELD OF INVENTION

This invention relates to an automatic tire pressure gauge that may be attached to a pneumatic tire to allow routine determination of the air pressure in the tire as well as monitoring of the air pressure while air is delivered to the tire.

BACKGROUND INFORMATION

Air is usually added to tires by a repeated series of checks on the tire pressure in alternation with additions of air to the tire followed eventually by a bleeding of any excess air from the tire. Overinflation of tires has caused accidents due to the impossibility of making accuratee pressure measurements during the tire filling process.

Gauges for routine daily measurement of tire air pressure to maximize vehicle safety and tire performance often may not be left on the tire during use of vehicle or are difficult to read to the type of pressure indicator or the angle or projection of the gauge from the tire. Most of the gauges now used are not visible to the operator of the vehicle at least half of the time due to the position of the dial face and the dial when the rotation of the tire ceases. In addition, gauges using liquid barometer pressure devices often are difficult to read after operation of the vehicle, even at slow speeds, due to foaming of the liquid in the gauge during rotation of the tires.

OBJECTS OF THE INVENTION

One object of the invention is to provide a tire pressure gauge whereby the tire pressure may be monitored while air is added to the tire.

Another object of the invention is to provide a tire pressure gauge whereby tires may be rapidly and accurately filled to the correct air pressure without the necessity of repeated disconnections of the gauge from the tire.

Another object of the invention is to provide a tire pressure gauge whereby the air pressure in the tire may be easily and accurately determined.

Another object of the invention is to provide a tire pressure gauge whereby air may be added to the tire or the pressure may be monitored regardless of the position of the tire air fill stem when the vehicle stops moving.

Another object of the invention is to provide a tire pressure gauge which is durable and long-lasting.

Another object of the invention is to provide a tire pressure gauge which is inexpensive to construct.

Another object of the invention is to provide a tire pressure gauge which is light in weight so as not to affect balancing of tires.

Another object of the invention is to provide a tire pressure gauge which may be left on the tire during vehicle use and during extensive periods of tire rotation without temporary or permanent disturbance of the air pressure measurement capability of the gauge.

Still other objects and advantages of the invention will be apparent to those of skill in the art after reading the following description of the preferred embodiment.

SUMMARY OF THE INVENTION

The present invention comprises an automatic self-metering tire gauge for accurately determining the pressure within a tire or any other pressure vessel by reading a meter attached to the needle valve assembly of the tire gauge. The invention is comprised of a pre-calibrated air pressure gauge placed between a filler needle valve and a tire attachment piece. The gauge measures air pressure within the tire when it is attached to the tire. The air pressure within the tire may be monitored at any time by observation of the gauge between additions of air to determine whether the tire is in need of air and during the addition of air to the tire to adjust the pressure to the correct level.

DESCRIPTION OF THE PREFERRED EMBODIMENT

Figure 1:
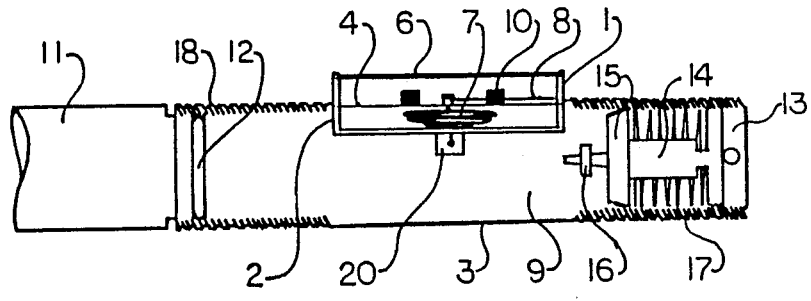
FIG. 1 is a schematic cross-sectional side view of a preferred embodiment of the invention.
Figure 2:
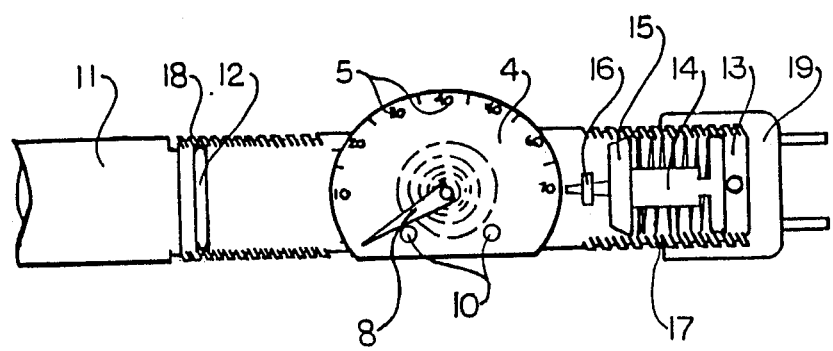
FIG. 2 is a schematic top view of a preferred embodiment of the invention.
Figure 5:
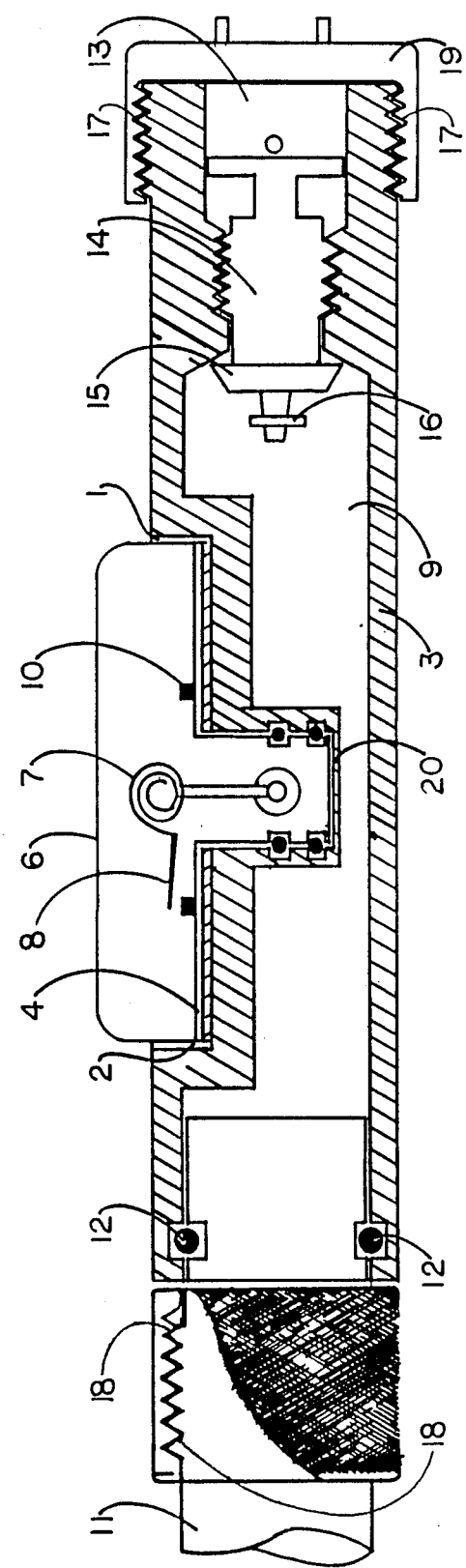
FIG. 5 is a schematic cross-sectional side view of a preferred embodiment of the invention.

FIGS. 1 and 2 show two views of the preferred embodiment of the invention in which a pressure gauge 1 is placed in a recessed meter mount 2 on a gauge channel 3 which gauge channel 3 is preferably linear. The gauge channel 3 is preferably of an outside diameter of $\frac{3}{4}$ inch or less to facilitate placement of the device on the tire air fill stem 11 so that the device fits through holes in various models of hub caps. The gauge 1 is comprised of a dial face 4 that is graduated with numerals 5 to indicate pressure. In the preferred embodiment the gauge will measure pressures of 0 to 70 pounds per square inch (psi). To facilitate making a pressure reading the dial face 4 may be divided into sections to various colors or the numerals 5 may be color coded. For example, the section of the dial measuring 0–30 psi may be in red, 30–40 psi in white, and 40–50 psi in green. The dial face 4 is covered by a magnifying watch glass 6 to further enhance ease of reading the pressure. Preferably both the gauge 1 and the dial face 4 are made of plastic or shatter-resistant materials. In the preferred embodiment a coiled or helical pressure tube 7 such as a Bourdon tube is used to respond to pressure in the tire. Other gauge types such as geared or electronic gauges including piezo-sensitive devices may be used instead of a pressure tube or Bourdon tube. The pressure tube 7 is connected to a cursor 8 at one end and opens into an O-ring hermetic spool assembly 20 in a gauge cavity 9 at the other end, allows continual, instantaneous response of the cursor 8 to changes in air pressure within the gauge cavity 9 when the hermetic spool assembly 20 is open to the gauge cavity 9. The hermetic spool assembly 20 is comprised of two tubular sections, the first inner tube 21 being inside the second tube 22. Each of the two tubes has a small hole in the side of it. The tubes are attached to the base of the pressure gauge 1, are mounted on an O-ring, 23 and may be rotated with respect to each other. Rotation of the inner tube 21 with respect to the outer tube 22 causes the inner hole 25 on the inner tube 21 and the outer hole 24 on the outer tube 22 on the tubes to either be aligned as shown in FIG. 5 allowing air to enter the interior of the inner tube, or nonaligned, sealing the interior of the hermetic spool assembly 20 from the gauge cavity 9. The hermetic spool assembly 20 is not necessary for the invention to be useful but allows the operator to protect the gauge from exposure to excessive air pressures during filling of the tire.

The cursor 8 is kept from going off scale by the presence of cursor stops 10 placed on the dial face 4 at the lower and upper ends of the pressure range. The cursor stops 10 may be made of spongy soft plastic or other material to cushion the impact of the cursor 8 against the cursor stops 10. In use, the invention is attached to the tire air fill stem 11 or tire inflating tube by means of threads 18. In the preferred embodiment, the threads 18 are of a 5/16 inch inner diameter with a number 32 thread so that the device fits on the tire air fill stem 11. The threads should be precision threads to facilitate a hermetic seal. Teflon tape, pipe dope or other sealant may also be used to aid in making the airtight connection to the tire. An O-ring swivel mechanism 27 at one end of the gauge channel 3 fits over the tire air fill stem 11.

Figure 6:
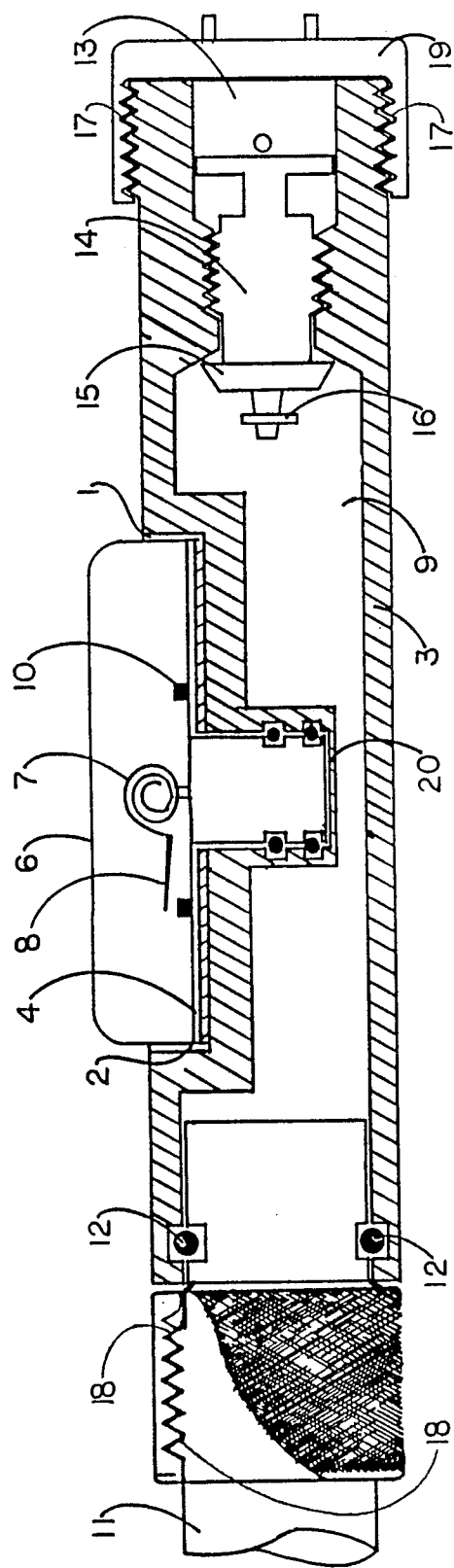
FIG. 6 is a schematic cross-sectional side view of a preferred embodiment of the invention.

As shown in cross-section in FIGS. 5 and 6, in the preferred embodiment the O-ring swivel mechanism 27 is comprised of an inner end tube 26 that fits tightly inside the end O-ring 12. One end of the inner end tube 26 extends inward into the gauge cavity 9 inside the gauge channel 3, and the other end of the inner end tube 26 is inwardly threaded and is sized to fit over the air fill stem 11. The outer portion of the O-ring swivel mechanism 27 is comprised of the end of the gauge channel 3 and is external to the O-ring 12 and is indented to fit tightly around the O-ring 12 to create a hermetic seal. This swivel mechanism 27 allows the gauge channel 3 to be rotated about its axis without tightening or loosening the pressure gauge 1 as a whole from the air fill stem 11. The swivel mechanism 27 allows the position of the gauge 1 to be adjusted and the gauge 1 to be placed upright for ease of reading the pressure when the invention is attached to the tire and allows tightening and adjustment of the position of the invention on the air fill stem 11. An inflation port 13 is at the opposite end of the gauge tube 3 from the swivel mechanism 27. The inflation port 13 is comprised of a bleeder valve 14 which allows movement of air through the inflation port 13. A teflon seal 15 provides a hermetic seal and ensures that there is a plenum inside the invention device and that air does not leak from the device. The air bleed escape valve 16 enables inflation and deflation of the tire or other pressured device to which the invention is attached. The threaded area 17 facilitates installation of the device and allows the cap tool 19 to be put on the device. The threaded connection also helps maintain a hermetic condition within the device.

Figure 3:
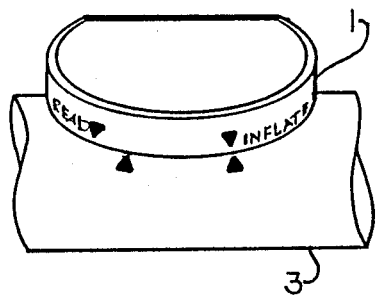
FIG. 3 is a perspective view of a section of the preferred embodiment of the invention.
Figure 4:
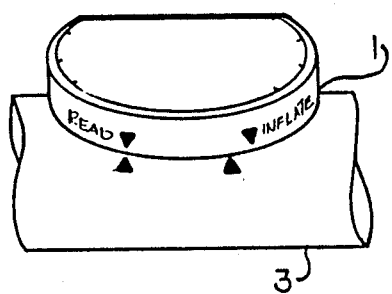
FIG. 4 is a perspective view of a section of a preferred embodiment of the invention.

When the invention is used to monitor tire pressure during the addition of air to the tire, the operator connects the invention to the tire if it is not already connected. An air source is then connected to the inflation port 13. During filling of the tire, the hermetic spool assembly 20 may be rotated so that the pressure tube 7 is not exposed to entering air and thus the problem of excess air pressure on the pressure tube 7 is avoided. The air first moves into the gauge channel 3. After equilibration of the air in the tire, the hermetic spool assembly 20 can be rotated to admit air to the pressure tube 7, to allow the operator to monitor the tire pressure. When the hermetic spool assembly 20 is open to allow the air to reach the pressure tube 7, the air equilibrates within the tire, gauge channel 3 and pressure tube 7. The cursor 8 responds to indicate the pressure on the pressure tube 7 which is equal to the pressure within the tire. The operator can add more air or bleed off excess air and monitor the dial face 4 to determine when the correct tire pressure has been obtained. Rotary movement of the pressure gauge 1 causes the pressure tube 7 to be either exposed to the interior of the gauge channel 3 or to be separated from the interior of the gauge channel 3 due to rotation of the tubes of the hermetic spool assembly 20 into aligned (FIG. 5) or nonaligned (FIG. 6) positions. FIGS. 3 and 4 show the device adjusted for inflation of the tire and reading the tire pressure, respectively. As an alternative to the 0-70 psi gauge and the hermetic spool assembly 20, a heavy-duty pressure gauge, designed to measure the higher pressures (approximately 175 to 200 psi) found in typical filling station compressors, may be used.

The invention may be used to monitor tire pressure on a routine daily basis. Because of the inexpensive nature of the invention, it is advantageous for vehicle owners to have a tire pressure gauge on each tire on their vehicles. The vehicle owners may then check the tire pressure on all tires merely by walking around the vehicle and glancing at the dial faces of each gauge. The gauge may remain on the tires because it is not adversely affected by rotation of the tires during use of the car. The centrifugal force on the gauge is transformed to rapidly equalizing pressure within the tire and device as the tire rotates. Closing the spool device 20 so that the pressure tube 7 is not exposed to the pressure within the gauge channel 3 will also decrease any problems that might occur due to centrifugal force and excess pressures during high speed or prolonged movement of the car.

I claim:

1. A tire pressure gauge device which comprises:
   (a) a straight linear airtight air flow tube having a central bore, an inflation end and a tire connector end;
   (b) a dial gauge comprised of a pressure-indication dial and a cursor, said dial gauge attached to the air flow tube and placed between the inflation end and the tire connection end;
   (c) a coiled pressure tube connected to the cursor and having an internal bore openable to the central bore; and
   (d) means for adjusting the position of the dial gauge for observation at any position of the airtight air flow tube.

2. The tire pressure gauge device as recited in claim 1, wherein the coiled pressure tube is a Bourdon tube.

3. The tire pressure gauge device as recited in claim 2, wherein the tire connector end is threaded to fit on a tire air fill stem and wherein the means for adjusting the position of the dial gauge for observation at any position of the airtight air flow tube comprises an O-ring swivel mechanism.

4. The tire pressure gauge as recited in claim 3 wherein the dial gauge is a heavy-duty dial gauge which measures pressures up to 200 pounds per square inch.

5. The tire pressure gauge device as recited in claim 3, wherein the air flow tube is linear.

6. The tire pressure gauge device as recited in claim 5, wherein the gauge is partially recessed into the central bore of the air flow tube.

7. A tire pressure gauge device which comprises:

(a) an airtight linear air flow tube having a central bore, inflation end and a tire connector end;

(b) a dial gauge comprised of a pressure-indicating dial and a cursor, said dial gauge partially recessed into the central bore of the air flow tube and placed between the inflation end and the tire connector end;

(c) a movable hermetic spool assembly; and (d) a coiled pressure tube connected to the cursor and having an internal bore that may be opened to the central bore by movement of the hermetic spool assembly.

8. The tire pressure gauge as recited in claim 7 wherein the tire connector end is threaded to fit on a tire air fill stem and further comprises an O-ring swivel mechanism for firmly attaching the gauge device to the tire air fill stem in a variety of positions.

9. The tire pressure gauge as recited in claim 8 wherein the inflation end is threaded and further comprises a filler needle valve and a teflon seal.

10. The tire pressure gauge as recited in claim 9 in which the gauge channel has a diameter of ¾ inch or less.

11. The tire pressure gauge as recited in claim 9 in which a plurality of cursor stops is placed on the dial face.

12. The tire pressure gauge as recited in claim 9 in which the dial gauge measures pressures up to 70 pounds per square inch.

13. The tire pressure gauge as recited in claim 9 further comprising a magnifying watch glass cover on the dial gauge.

14. The tire pressure gauge recited in claim 8, wherein the dial gauge has a dial face that has color-coded indications of pressure.

15. A tire pressure gauge device which comprises:

(a) an airtight linear air flow tube having a central bore, an inflation end and a tire connector end;

(b) a dial gauge comprised of a pressure-indicating dial that may be rotated into either a first position or a second position, a cursor and cursor stops on the pressure-indicating dial, said dial gauge partially recessed into the central bore of the air flow tube and placed between the inflation end and the tire connector end;

(c) a coiled pressure tube connected to the cursor and extending into the central bore; and (d) a hermetic spool assembly attached to the dial gauge and surrounding the portion of the pressure tube that extends into the central bore, rotation of the dial gauge into the first position causing the coiled pressure tube to open to the central bore, and rotation of the pressure-indicating dial into the second position causing the coiled pressure tube to not be open to the central bore.

16. The tire pressure gauge device as recited in claim 15, wherein the inflation end is threaded and the tire connector end is threaded to fit on a tire air fill stem, the inflation end further comprising a filler needle valve and a teflon seal, and the tire connector comprising a filler needle valve and a teflon seal, and the tire connector end further comprising an O-ring swivel mechanism for firmly attaching the gauge device to the tire air fill stem in a variety of positions.

17. The tire pressure gauge device as recited in claim 16, wherein the gauge channel has a diameter of ¾ inch or less.

18. The tire pressure gauge device as recited in claim 17, further comprising a magnifying watch glass cover on the dial gauge.

19. A tire pressure gauge device which comprises:

(a) a straight linear airtight air flow tube having a central bore, an inflation end and a tire connector end;

(b) a dial gauge comprised of a pressure indicating dial and a cursor, said dial gauge attached to the air flow tube and placed between the inflation end and the tire connector end;

(c) a pressure sensitive device connected to the cursor and exposed to the central bore; and (d) means for adjusting the position of the dial gauge for observations at any positions of the airtight air flow tube.

* * * * *